United States Patent
Thompson

(10) Patent No.: US 7,303,502 B2
(45) Date of Patent: Dec. 4, 2007

(54) GEAR CHANGE MECHANISM

(75) Inventor: Robert William Thompson, Farnborough (GB)

(73) Assignee: Qinetiq Limited (GB)

( * ) Notice: Subject to any disclaimer, the term of this patent is extended or adjusted under 35 U.S.C. 154(b) by 73 days.

(21) Appl. No.: 10/579,985

(22) PCT Filed: Nov. 30, 2004

(86) PCT No.: PCT/GB2004/005040

§ 371 (c)(1),
(2), (4) Date: May 22, 2006

(87) PCT Pub. No.: WO2005/054712

PCT Pub. Date: Jun. 16, 2005

(65) Prior Publication Data

US 2007/0155579 A1    Jul. 5, 2007

(30) Foreign Application Priority Data

Dec. 2, 2003    (GB) ................... 0327904.9

(51) Int. Cl.
*F16H 3/44*    (2006.01)
(52) U.S. Cl. ...................... 475/296; 475/317
(58) Field of Classification Search ............. 475/269, 475/296, 303, 320, 317
See application file for complete search history.

(56) References Cited

U.S. PATENT DOCUMENTS 3,477,314 A * 11/1969 Rutkowski ............... 475/296
4,286,480 A * 9/1981 Dickie ..................... 475/269
5,522,776 A * 6/1996 Alvey ....................... 477/35
6,196,944 B1 * 3/2001 Schmitz .................... 475/303

FOREIGN PATENT DOCUMENTS

| EP | 0 636 506 | 2/1995 |
| EP | 0 882 912 | 12/1998 |
| FR | 2758870 | 7/1998 |
| GB | 749 248 | 5/1956 |
| GB | 768 342 | 2/1957 |
| GB | 806 111 | 12/1958 |
| GB | 1 342 765 | 1/1974 |
| GB | 2 103 735 | 2/1983 |
| JP | 8091072 | 4/1996 |
| JP | 11342758 | 12/1999 |
| WO | WO 02/083483 | 10/2002 |

* cited by examiner

*Primary Examiner*—Roger Pang
(74) *Attorney, Agent, or Firm*—McDonnell Boehnen Hulbert & Berghoff LLP

(57) ABSTRACT

A gear change mechanism coupling a pair of shafts employs a planetary gear set comprising a sun gear fast with a first of the shafts, planet gears in a planet carrier, and an annulus or ring gear, the latter being fixed. A selector hub slidable on the other of the shafts has sets of radially spaced dogs to engage with corresponding dogs on the planet carrier and sun gear respectively, so as to couple the shafts at two different ratios depending on the axial position of the selector hub. This results in a more axially compact package than conventional dog clutch gear changers. In an alternative embodiment a reversing mechanism is provided by fixing the planet carrier and engaging the selector hub with the sun gear or annulus depending on its axial position.

8 Claims, 6 Drawing Sheets

GEAR CHANGE MECHANISM

BACKGROUND OF THE INVENTION (1) Field of the Invention

The present invention relates to gear change mechanisms and more particularly to such mechanisms employing dog clutches. Mechanisms according to the invention may be found useful in a variety of vehicular applications or in other machinery where a simple, robust and compact gearbox is required, one particular application being for a battle tank, bulldozer or other skid steered vehicle equipped with a drive configuration as described in WO-02/083483.

(2) Description of the Art

Constant-mesh gearboxes commonly employ dog clutches in the selection of different gear ratios. In a typical arrangement a gear selector hub is splined on an output shaft with freedom to slide axially along the shaft but so that the shaft must always rotate with the selector hub. Gears driven by the engine or other prime mover at different ratios are located coaxially to either side of the selector hub. The confronting faces of the selector hub and gears are formed with complementary axial projections and/or indentations (dogs) so that when the hub is slid, by an associated operating mechanism, in either direction from a central neutral position towards one of the gears, the respective dogs on the hub and gear will engage to transmit torque to the hub and output shaft from the selected gear at its respective ratio. This is a simple, robust and effective mechanism but necessarily occupies significant space in the axial direction due to the spacing of the gears, the provision of the dogs at opposite ends of the selector hub and the room required for the selector hub to shuttle between the gears.

SUMMARY OF THE INVENTION

The present invention seeks to provide a gear change mechanism operating on the dog clutch principle but which can be more compact than conventional such mechanisms at least in the axial direction.

In one aspect the invention accordingly resides in a gear change mechanism comprising: a rotary input member and a rotary output member; a planetary gear set comprising a sun gear, a set of planet gears meshing with the sun gear and borne by a common planet carrier, and an annulus meshing with the planet gears; and a gear selector member arranged to turn with one of said input member and output member and borne for axial movement relative to the planetary gear set; a first of said sun gear, planet carrier and annulus being arranged to turn with the other of said input member and output member, and a second of said sun gear, planet carrier and annulus being held non-rotatably; the gear selector member comprising first and second sets of dogs spaced radially relative to each other, said first and the third of said sun gear, planet carrier and annulus being arranged to turn with third and fourth sets of dogs respectively which are adapted to engage with said first or said second set of dogs respectively when the gear selector member is moved to a respective axial position; the torque-transmission contact faces of the dogs in each of said sets having a greater radial than axial dimension, and the circumferential widths of the dogs in each of said sets being less than the circumferential spacing of the dogs in the respective set with which they are adapted to engage.

By virtue of the provision of a planetary gear set to provide a change of gear ratio (and/or direction) in a mechanism according to the invention, and the consequent radial spacing of the corresponding sets of dogs, an axially compact unit can be achieved. The axial space requirement of the mechanism is further minimised by the above-defined form of the torque-transmission contact faces of the dogs without detriment to the torque-transmission capacity of the dogs, and the above-defined spacing of the dogs facilitates their engagement without requiring accurate speed synchronisation between the respective components, all as will be more particularly described hereinafter.

In another aspect the invention resides in a drive configuration for a skid steered vehicle comprising a respective drive member at each side of the vehicle; at least one propulsion motor coupled to turn said drive members and coupled through a controlled differential device to a steer motor; and a respective gear change mechanism as defined above in the transmission between said propulsion motor(s) and each said drive member.

DESCRIPTION OF THE FIGURES

These and other aspects and features of the invention will now be more particularly described, by way of example, with reference to the accompanying drawings, in which.

DETAILED DESCRIPTION OF THE INVENTION

Figure 1:
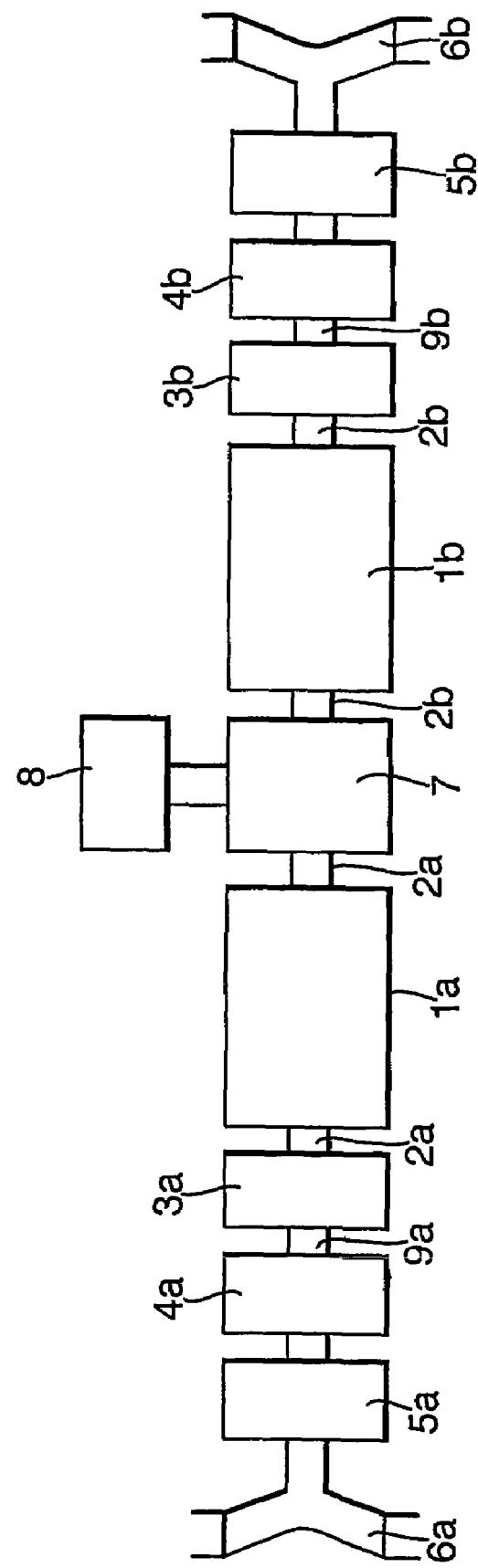
FIG. 1 is a diagrammatic illustration of a drive configuration for a skid steered vehicle to which the invention may be applied.

FIG. 1 illustrates diagrammatically one form of drive configuration with which gear change mechanisms in accordance with the present invention may be found particularly useful, being a track drive arrangement for a skid steered vehicle according to WO-02/083483. It is to be understood, however, that the present mechanisms are more generally applicable to gear change functions in vehicles or other machinery, particularly where an axially compact mechanism is required.

In FIG. 1 a transverse drive arrangement comprises two electric propulsion motors 1a and 1b turning drive shafts 2a and 2b. Outboard of the motors the transmission includes in each case a gear change unit 3a, 3b brake 4a, 4b and final drive gear reduction 5a, 5b, all encased within the vehicle hull, leading to respective track drive sprockets 6a and 6b at opposite sides of the vehicle. Inboard the motor shafts 2a and 2b are coupled to a controlled differential 7 driven by an electric steer motor 8, all as described in WO-02/083483 the contents of which are hereby incorporated by reference.

Figure 2:
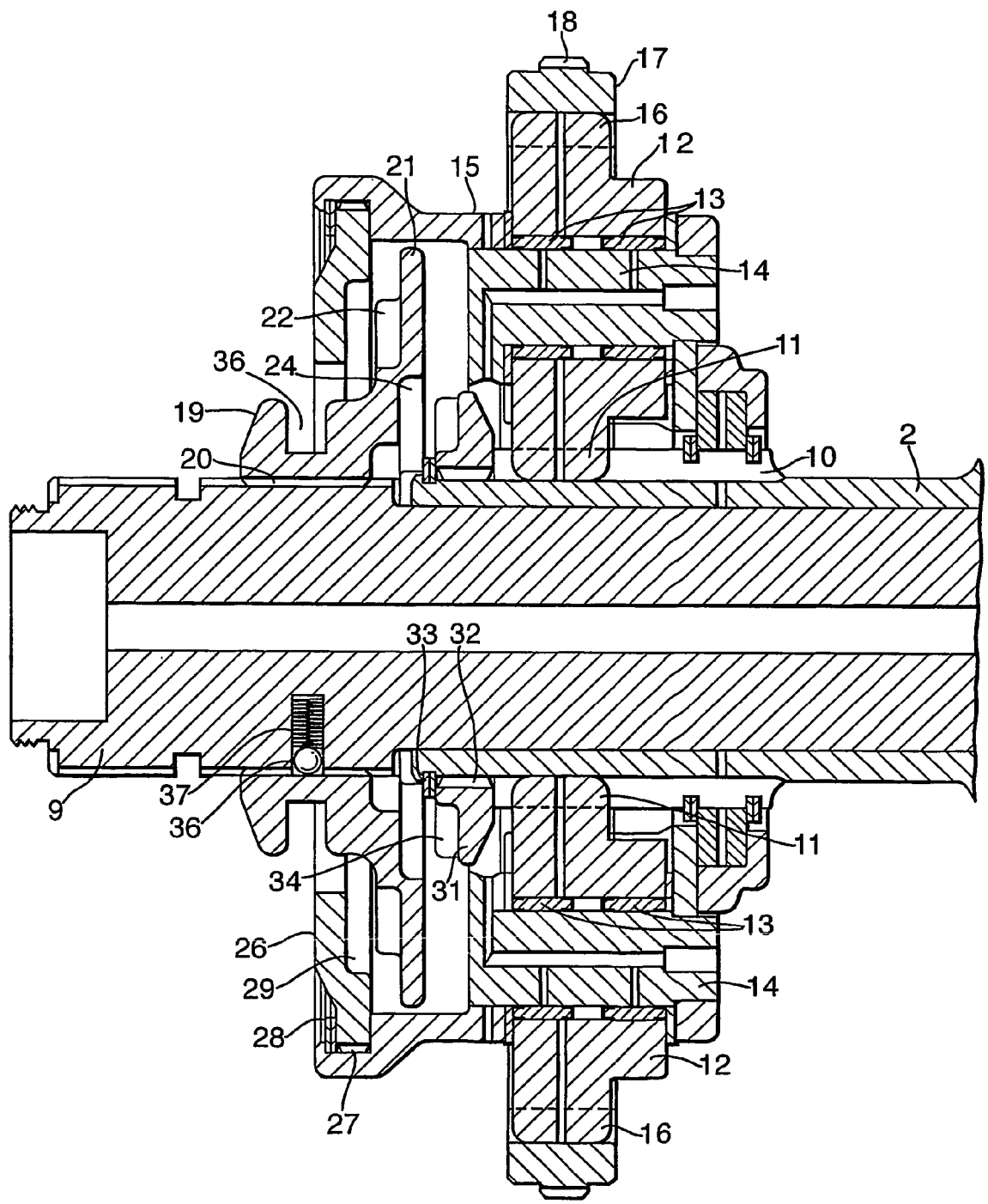
FIG. 2 is an axial cross-section through a preferred embodiment of a gear change mechanism according to the invention, in a neutral condition.

FIG. 2 illustrates an embodiment of a mechanism according to the invention for changing the gear ratio in transmission of rotation from an input shaft 2 to an output shaft 9. In the context of FIG. 1, therefore, a mechanism of this kind would be used in the units 3a and 3b on opposite sides of the vehicle (configured in mirror image) between the respective drive shaft 2a, 2b and output shaft 9a, 9b.

In FIG. 2 there is a hollow input shaft 2 which surrounds over part of its length the output shaft 9. The end of the shaft 2 is formed as a sun gear 10 of a planetary gear set which meshes as at 11 with a plurality (four in this embodiment) of planet gears 12. The planet gears 12 are borne by needle roller bearings 13 for rotation about respective pins 14 held in a common planet carrier 15. The planet gears 12 also mesh as at 16 with an annulus or ring gear 17 which is held non-rotatably by splines 18 in a fixed casing (not shown). As will be appreciated, rotation of the input shaft 2 and sun gear 10 causes the planet gears 12 to revolve about the sun gear (by virtue of the fixed annulus 17) thus causing the planet carrier 15 to rotate in the same sense as, but slower than, the input shaft and sun gear; in this embodiment the speed reduction ratio is typically 4:1.

Figure 3:
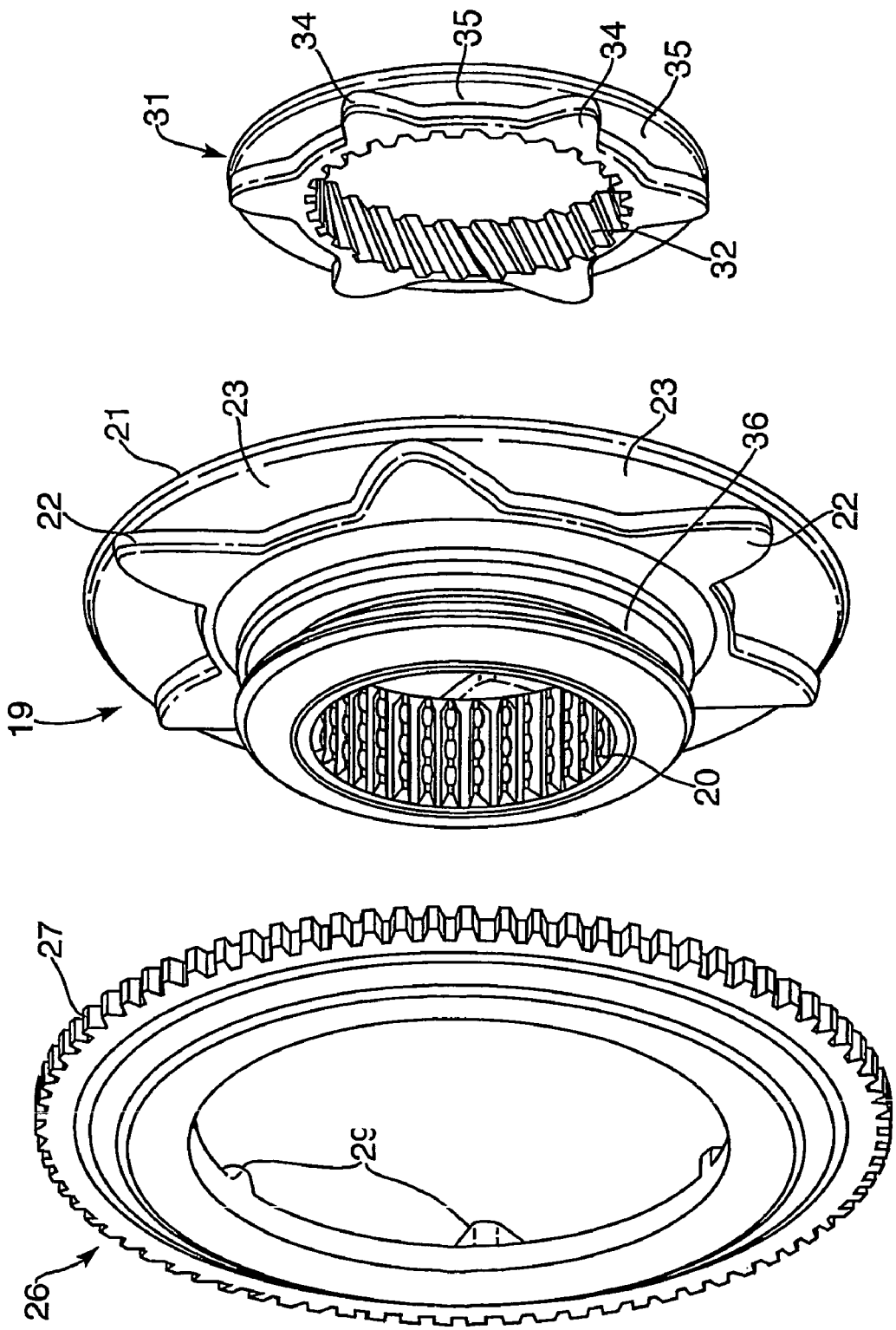
FIG. 3 is a three-quarter view, from one side, of the dog rings and gear selector hub comprised in the mechanism of FIG. 2.
Figure 4:
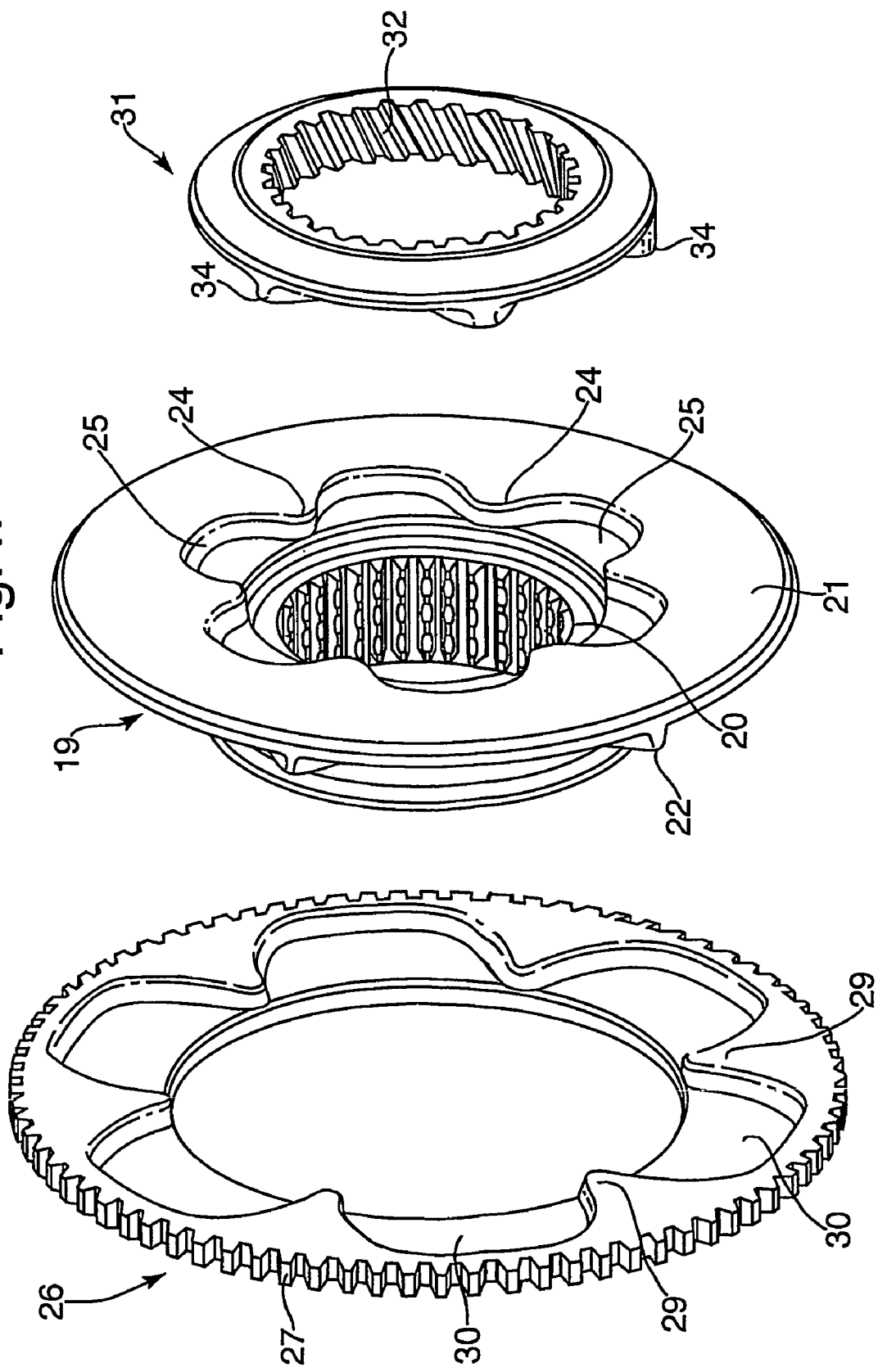
FIG. 4 is a three-quarter view of the components of FIG. 3 from the opposite side.

FIG. 2 illustrates the mechanism in a neutral condition in which the planetary gear set merely idles as the input shaft 2 is turned. In order to transmit rotation to the output shaft 9 at a selected one of two gear ratios, however, a gear selector hub 19 is mounted by splines 20 to the output shaft so that the hub and shaft must turn together but the hub is able to slide axially on the shaft in either sense of direction from the position illustrated in FIG. 2. With reference also to FIGS. 3 and 4 the selector hub 19 has a disc-like annular flange portion 21 which is formed on its opposite sides with two sets of dogs: on the left hand (as viewed) side there are alternating axial projections (dogs) 22 and indentations 23 and on the right hand (as viewed) side there are alternating projections (dogs) 24 and indentations 25, the dogs 24 being disposed at a lesser radius from the axis of the hub than the dogs 22.

With further reference to FIGS. 2 to 4 a dog ring 26 is mounted by splines 27 to the planet carrier 15 and retained by a spiral retaining ring 28. On its right hand (as viewed) side the ring 26 is formed with a set of dogs defined by alternating axial projections 29 and indentations 30. A second dog ring 31 is mounted by splines 32 to the sun gear 10 and retained by a spiral retaining ring 33. On its left hand (as viewed) side the ring 31 is formed with a set of dogs defined by alternating axial projections 34 and indentations 35. The splines 32 of the ring 31 are shown as helically cut in FIGS. 3 and 4, as they engage with cut-down portions of helically-cut gear teeth at the end of the sun gear.

Figure 5:
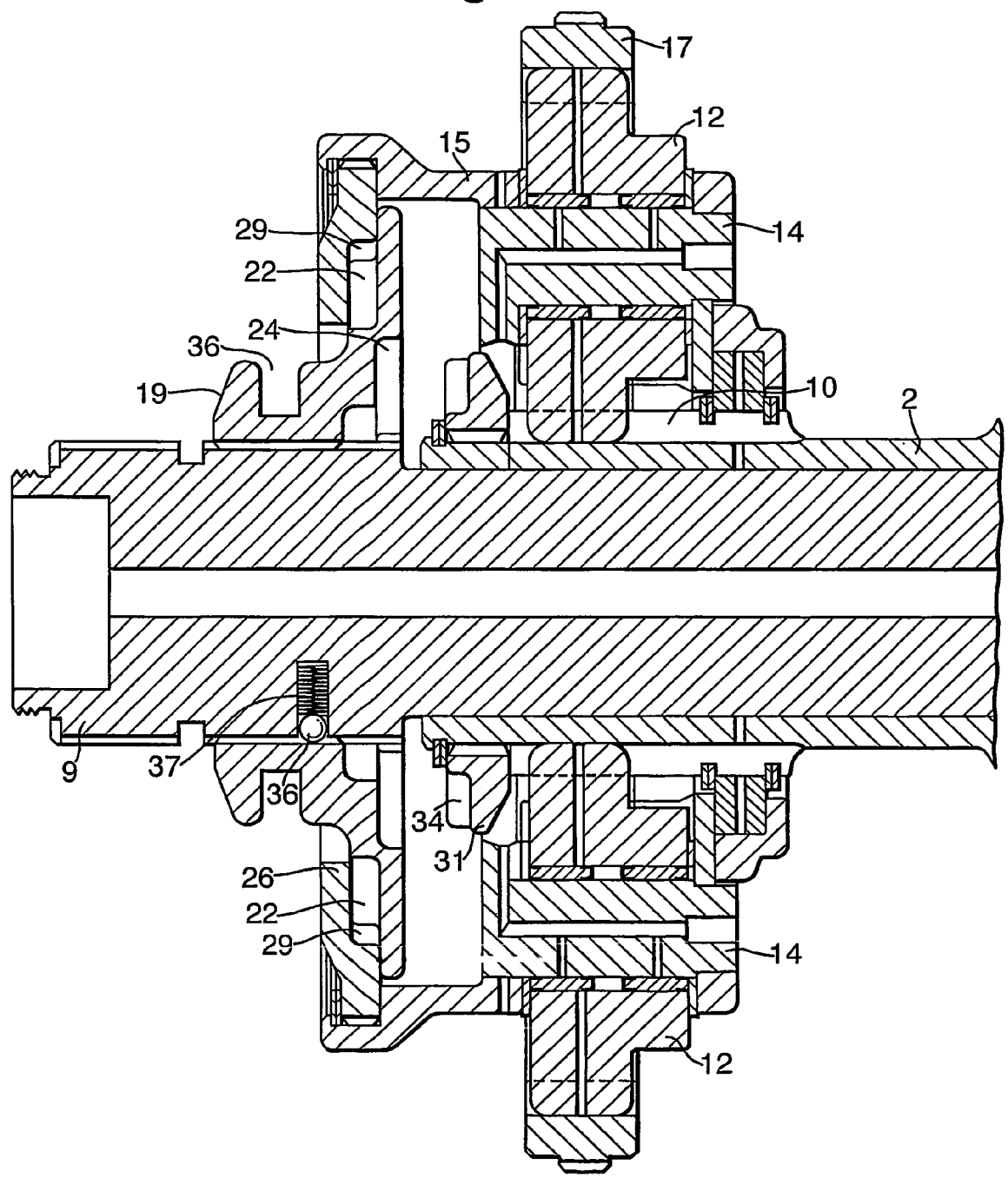
FIG. 5 is an axial cross-section through the mechanism of FIG. 2 in a low gear condition.
Figure 6:
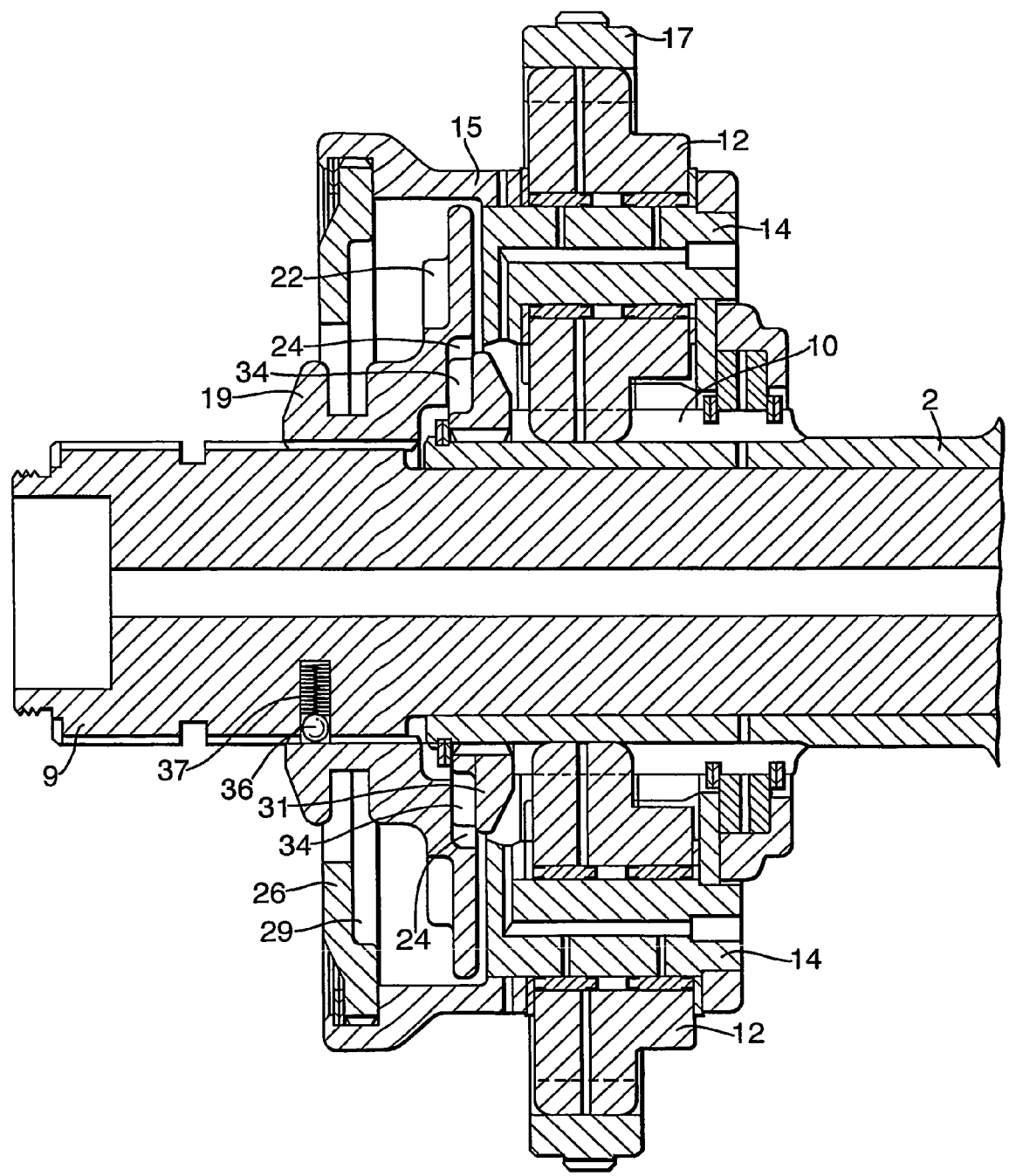
FIG. 6 is an axial cross-section through the mechanism of FIG. 2 in a high gear condition.

To engage either low or high gear ratio the selector hub 19 is shifted either to the left or right (as viewed) on the shaft 9 from the position illustrated in FIG. 2. For this purpose an appropriate actuating mechanism is provided terminating in a selector fork (not shown) which engages in an annular groove 36 in the hub. FIG. 5 illustrates the engagement of low gear ratio. As the selector hub 19 moves to the left (as viewed) its dogs 22 are forced into the indentations 30 of the dog ring 26 and, after a small degree of relative angular movement, to take up the circumferential clearance between the respective sets of dogs, the flanks of the dogs 22 are abutted by the flanks of the dogs 29 to transmit torque to the shaft 9 at the speed of the planet carrier 15 (i.e. reduced by the above mentioned ratio of 4:1 from the input shaft 2). FIG. 6 illustrates the engagement of high gear ratio. As the selector hub 19 moves to the right (as viewed) its dogs 24 are forced into the indentations 35 of the dog ring 31 and, after a small degree of relative angular movement, to take up the circumferential clearance between the respective sets of dogs, the flanks of the dogs 24 are abutted by the flanks of the dogs 34 to transmit torque to the shaft 9 at the speed of the sun gear 10 (i.e. at a 1:1 ratio to the input shaft 2).

In any shifting between low and high gears the selector hub 19 passes through the neutral condition of FIG. 2. A ball 36 biased by a spring 37 in a radial bore of the shaft 9 engages in a respective one of three corresponding recesses (not shown) in the selector hub 19 to provide a detent action in its neutral, low or high gear position as the case may be. When used in a drive arrangement as illustrated in FIG. 1, whenever the selector hub 19 is shifted to disengage a gear the propulsion motors 1a and 1b are momentarily de-energised to relieve the applied torque and when shifted to engage a gear their speed will be approximately adjusted to facilitate entry of the respective dogs 22 or 24 into the corresponding indentations 30 or 35. However, the form and spacing of the respective sets of dogs 22/29 and 24/34 are such that accurate speed synchronisation between the respective rotating components is not required in order to engage a gear and in the illustrated embodiment a speed difference of typically ±200 rpm between the rings 26 or 31 and the hub 19 can be tolerated. In this respect it will be seen that the circumferential widths of the dogs 22, 24, 29 and 34 in each set are considerably less than the circumferential spacing of the dogs in the respective set with which they are intended to engage as represented by the corresponding indentations 30, 35, 23 and 25. This means that when the corresponding indentations are "found" as the selector hub 19 is forced against the dog ring 26 or 31 there is time for sufficient further axial movement of the hub to fully engage the respective dogs notwithstanding the rotational speed difference between the components. The flat axially-confronting faces of the dog sets also facilitate slipping between the components until the indentations are "found" if the dogs and indentations are not in register on initial contact.

It will be appreciated that in the illustrated mechanism the two elements which transmit rotation to the shaft 9 in selected gear ratios—namely the sun gear 10 and planet carrier 15—are spaced from each other essentially in the radial rather than axial direction, and the two sets of mating dogs represented by the projections 34 and 29 on the sun gear and planet carrier and the projections 24 and 22 on the selector hub 19 are likewise radially spaced. This leads to a mechanism which is substantially more compact in the axial direction in comparison with a conventional dog clutch gear change mechanism where dogs are provided at opposite ends of a selector hub for engagement with axially spaced gears. The flanks of the dogs 22, 24, 29 and 34 have a grater radial than axial dimension which further minimises the axial space requirement while maintaining a sufficient contact area between the flanks of respective dog sets for torque transmission between them, and these flanks will have an involute profile to maintain face-to-face contact notwithstanding a generous tolerance in the radial alignment of the hub 19 and rings 26/31. Furthermore, of the two sets of dogs 34/24 and 29/22 it is those at the greater radius (29/22) which transmit at the low gear ratio and they can readily be designed to have the greater load capacity to match the higher torque required to be transmitted at that ratio than the dogs at the smaller radius (34/24) which transmit at the high gear ratio.

Although the invention has been described above with reference to a mechanism in which the gear selector hub operates on the output side of the planetary gear set this need not necessarily be the case. For example a mechanism as illustrated in FIGS. 2 to 6 could be operated effectively in reverse where shaft 9 is the input shaft and shaft 2 is the output shaft. In this case the selector hub 19 would engage either with the sun gear 10 through the dogs 24/34 to drive the shaft 2 at a 1:1 ratio to the shaft 9, or with the planet carrier 15 through the dogs 22/29 to drive the shaft 2 at an increased ratio with respect to the shaft 9.

In other embodiments of the invention different permutations of the elements of a planetary gear set may be chosen to be fixed non-rotatably, driven by an input shaft, and engageable through dogs with an output shaft. In one such example the mechanism of FIGS. 2 to 6 is modified by fixing the planet carrier 15 instead of the annulus 17, so that the annulus is free to rotate, and instead of the planet carrier the annulus is equipped with dogs to engage the selector hub. In this case the shaft 9 will either be driven from the sun gear at a 1:1 ratio to the shaft 2, or from the annulus at a reduced ratio and in the opposite sense of rotation with respect to the shaft 2. Such a mechanism would therefore be useful for selecting between a forward and a reverse gear.

In the embodiment of the gear change mechanism illustrated in FIGS. 2 to 6 and as incorporated in the drive configuration of FIG. 1 it is sufficient to provide for the selection of only two different gear ratios (high and low range) because the electric propulsion motors 1a and 1b are themselves capable of generating appropriate levels of torque over a substantial speed range. In other applications where a greater number of gear ratios may be required, however, a plurality of such mechanisms could be cascaded in sequence.

The invention claimed is:

1. A gear change mechanism comprising:
   a rotary input member and a rotary output member;
   a planetary gear set comprising a sun gear, a set of planet gears meshing with the sun gear and borne by a common planet carrier, and an annulus meshing with the planet gears;
   and a gear selector member arranged to turn with one of said input member and output member and borne for axial movement relative to the planetary gear set;
   a first of said sun gear, planet carrier and annulus being arranged to turn with the other of said input member and output member, and a second of said sun gear, planet carrier and annulus being held non-rotatably;
   the gear selector member comprising first and second sets of dogs spaced radially relative to each other;
   said first and the third of said sun gear, planet carrier and annulus being arranged to turn with third and fourth sets of dogs respectively which are adapted to engage with said first or said second set of dogs respectively when the gear selector member is moved to a respective axial position;
   torque transmission contact faces of the dogs in each of said sets having a greater radial than axial dimension, and circumferential widths of the dogs in each of said sets being less than circumferential spacing of the dogs in the respective set with which they are adapted to engage.

2. A mechanism according to claim 1 wherein the gear selector member is borne upon the rotary output member to transmit rotation thereto but with freedom to move axially relative thereto.

3. A mechanism according to claim 1 wherein the sun gear is arranged to turn with the rotary input member, the annulus is held non-rotatably, and the sun gear and planet carrier are arranged to turn with said respective sets of dogs.

4. A mechanism according to claim 1 wherein the sun gear is arranged to turn with the rotary input member, the planet carrier is held non-rotatably, and the sun gear and annulus are arranged to turn with said respective sets of dogs.

5. A mechanism according to claim 1 wherein the gear selector member includes a disc-like portion with said first and second sets of dogs formed on opposite sides thereof.

6. A mechanism according to claim 1 wherein the third and fourth sets of dogs are formed on respective separate ring-like components which are assembled in torque-transmitting relation with the respective sun gear, planet carrier or annulus.

7. A drive configuration for a skid steered vehicle comprising a respective drive member at each side of the vehicle; at least one propulsion motor coupled to turn said drive members and coupled through a controlled differential device to a steer motor; and a respective gear change mechanism according to claim 1 in the transmission between said propulsion motor(s) and each said drive member.

8. A vehicle equipped with a drive configuration according to claim 7.

* * * * *